United States Patent Office 2,987,661
Patented June 6, 1961

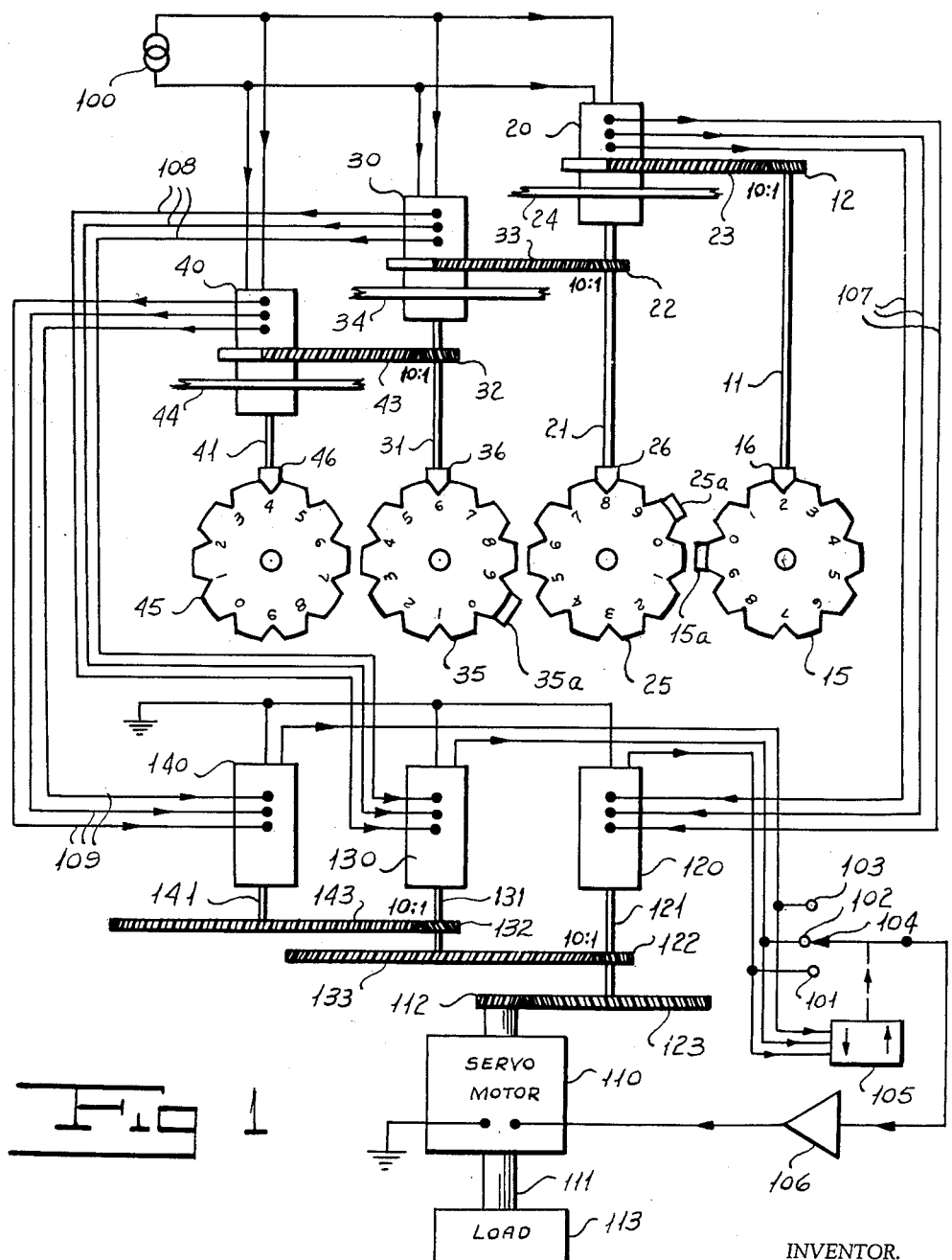

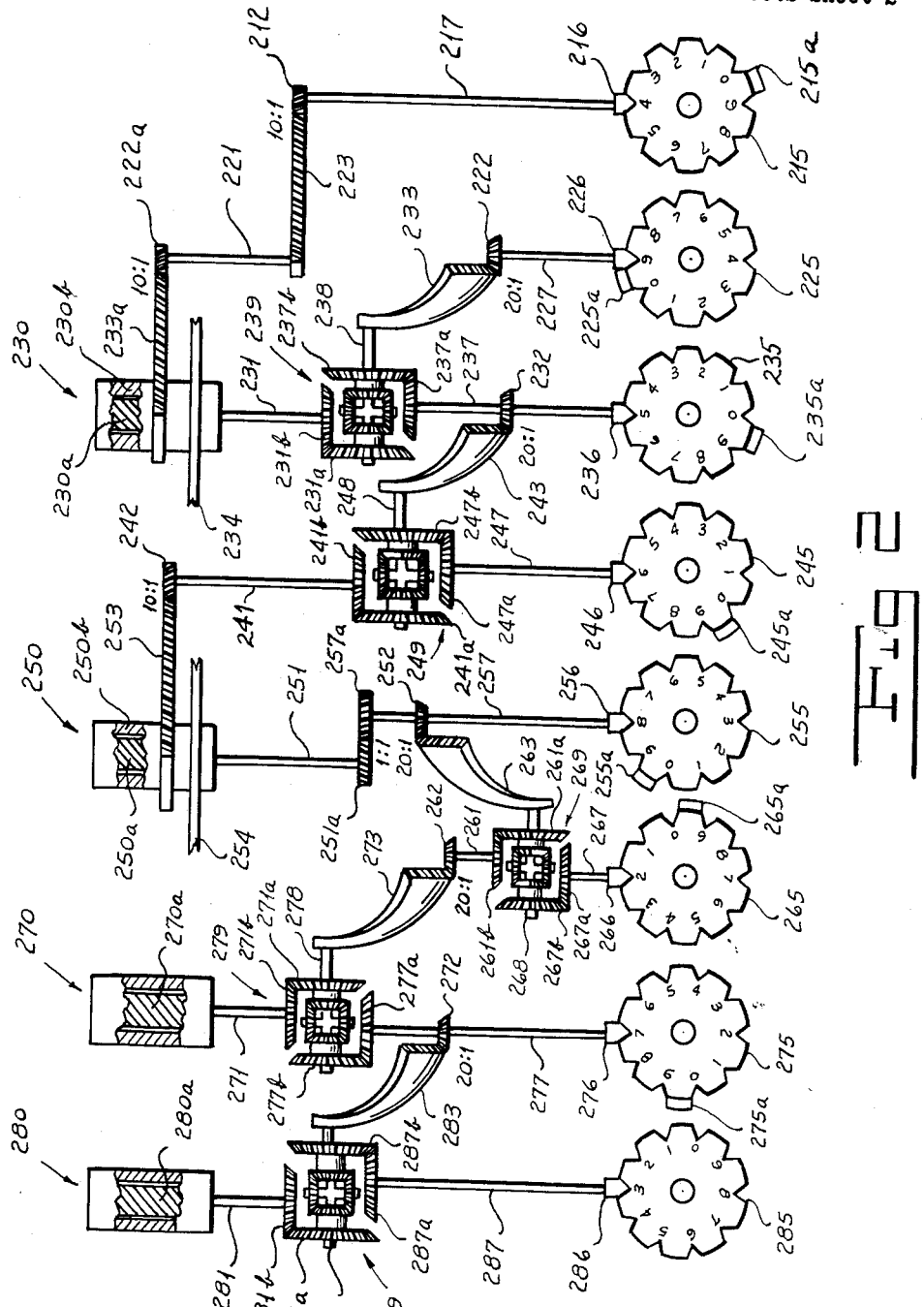

2,987,661
DIGITAL MULTIPLE SPEED SYNCHRO SYSTEM
Edwin P. Schweitz, Trumbull, Conn., assignor to United Aircraft Corporation, East Hartford, Conn., a corporation of Delaware
Filed Apr. 10, 1959, Ser. No. 805,621
9 Claims. (Cl. 318—30)

My invention relates to a multiple-speed digital synchro system and more particularly to the command section for a multiple-speed digital positioning system.

In multiple-speed synchro systems of the prior art, the high speed and low speed transmitters are coupled together by gearing having a certain speed ratio; and the high and low speed receivers, or control transformers, are coupled together by speed reduction gearing having the same ratio. Command inputs introduced as shaft rotation of the high and low speed transmitters are of a continuous nature. Assuming a gear reduction of 100 to 1 between the high speed and low speed transmitters, then in order to turn the low speed transmitter shaft through half a revolution, the high speed transmitter shaft must be laboriously turned through fifty revolutions. It would thus be advantageous if at least the transmitter section were of a digital nature so that the low speed transmitter shaft could be positioned independently of the high speed transmitter shaft.

There arises, however, the problem of eliminating ambiguities. Assume for the moment that the high and low speed transmitters are coupled together by speed reduction gearing having a ratio of 10 to 1, that the transmitter dials are adjusted to a setting of 35, and that it is desired that the high and low speed receiver or control transformer section be positioned in accordance with such setting. The low speed transmitter signal will cause the low speed receiver to be driven to a position of 30 at which the low speed system is rendered inoperative and the high speed system is rendered operative. At this position of 30, the high speed system will be at an unstable or false null. Hence the receiver section may be driven either to the desired position of 35 or to the erroneous position of 25. If the transmitter setting is 30, 31, 32, 33, or 34, then the receiver section will probably be driven to the proper position. However, for transmitter settings of 36, 37, 38, and 39, the receiver system probably will be driven to the positions of 26, 27, 28, and 29, respectively, thereby introducing an appreciable error.

One object of my invention is to provide a multiple-speed digital synchro system where commanded position may be introduced by a few clicks of appropriate dials without the necessity of laboriously turning the high speed transmitter shaft through many many revolutions.

Another object of my invention is to provide a multiple-speed digital synchro system in which the receivers or control transformers will always be positioned precisely in accordance with the transmitted settings and where no possibility of ambiguity or error exists.

Other and further objects of my invention will appear from the following description.

In general my invention contemplates the use of differential motions to introduce into a lower speed transmitter the digital quantity representing the most significant of the digits introduced into the next higher speed transmitter. In one form of my invention the differential motion is obtained by moving the lower speed transmitter rotor in one direction and moving the lower speed transmitter stator in the opposite direction. In a second form of my invention the differential motion is obtained by using a differential mechanism to move the lower speed transmitter rotor in the same direction.

In the accompanying drawings which form part of the instant specification and which are to be read in conjunction therewith and in which like reference numerals are used to indicate like parts in the various views:

FIGURE 1 is a schematic view of a four-place synchro system using three synchro transmitters and three synchro receivers or control transformers and embodying the first form of my invention.

FIGURE 2 is a fragmentary schematic view of an eight-place transmitter section using four synchro transmitters and embodying the second form of my invention and various combinations of the first and second forms.

More particularly referring now to FIGURE 1, I provide three synchro transmitters 20, 30, and 40. The rotor windings of the transmitters are energized from a source of alternating current potential 100 of a suitable frequency, such as 60 or 400 cycles per second. I provide three synchro receivers, or control transformers, 120, 130, and 140. The three stator terminals of high-speed transmitter 20 are connected by conductors 107 to three stator terminals of high-speed receiver 120. The three stator terminals of intermediate-speed transmitter 30 are connected by conductors 108 to the three stator terminals of intermediate-speed receiver 130. The three stator terminals of low-speed transmitter 40 are connected by conductors 109 to the three stator terminals of low-speed receiver 140. One terminal of the rotor winding of each of the receivers is grounded. The other terminal of the rotor winding of high-speed receiver 120 is connected to switch contact 101. The other terminal of the rotor winding of intermediate-speed receiver 130 is connected to switch contact 102. The other terminal of the rotor winding of low-speed receiver 140 is connected to switch contact 103. Switch armature 104 is adapted to selectively engage only one of contacts 101 through 103 and is shown in engagement with contact 102. Armature 104 is connected to the input of a servo amplifier 106. The output of amplifier 106 is impressed upon a servomotor 110. Servomotor 110 may conveniently be a two-phase induction machine; the output of amplifier 106 may energize the variable phase; and the fixed phase, as is well-known in the art, may be connected through a phase-shifting capacitor to the source of alternating current 100. Alternatively, servomotor 110 may comprise a direct-current machine having a constant field excitation; and amplifier 106 may comprise a phase-sensitive demodulator for supplying positive or negative armature voltage. The output shaft 111 of servomotor 110 mounts a pinion 112 which meshes with a gear 123 secured to the rotor shaft 121 of receiver 120. Also secured to rotor shaft 121 is a pinion 122 which meshes with a gear 133 affixed to the rotor shaft 131 of receiver 130. Also mounted on rotor shaft 131 is a pinion 132 meshing with gear 143 affixed to the rotor shaft 141 of receiver 140. The speed reduction between rotor shafts 141 and 131 is 10 to 1. The speed reduction between rotor shafts 131 and 121 is likewise 10 to 1. The speed reduction between rotor shaft 121 and the servomotor output shaft 111 is not critical and may be selected with regard to the usual design considerations. Output shaft 111 of servomotor 110 also drives a load device 113, such as a machine tool or any other member to be positioned. The stators of the three receivers 120, 130, and 140 and the stator of servomotor 110 are each constrained from rotating. The ungrounded terminal of the rotor winding of each of the receivers is connected to an input of a stepper motor 105 which controls switch armature 104. As is well-known in the art, when the output signal of receiver 130 exceeds a predetermined fraction, such as 0.866, of the maximum possible error signal, then stepper motor 105 causes armature 104 to move upwardly to engage contact 103. As is also well-known in the art, stepper motor 105 moves armature 104 downwardly to engage contact 101 when the output signal of receiver 130 is less than a predetermined fraction, such as 0.104, of the maximum possible error signal.

The configuration as thus far described is identical to a conventional synchro system. My invention resides in the transmitter section.

The stators of transmitters 20, 30, and 40 of my synchro system are rotatably mounted in respective stationary supports 24, 34, and 44, so that, unlike conventional transmitters, the stators of my transmitters are not constrained from rotation.

I have shown in FIGURE 1 a four-place transmitter. The most significant digit is introduced by rotation of dial 45 which is provided with ten notches spaced precisely 36° apart. A stationarily mounted detent 46, which may be biased either by spring force or by gravity, is adapted to engage the notches and to accurately position dial 45 in any one of its ten positions. Dial 45 is secured to the rotor shaft 41 of transmitter 40. The next most significant digit is introduced by rotation of dial 35 which is provided with ten notches accurately spaced 36° apart. A spring or gravity biased detent 36 is adapted to coact with the notches of dial 35 to maintain it in any selected one of its ten positions. Dial 35 is provided with a limit stop 35a between the "9" and "0" positions. Dial 35 is connected to the rotor shaft 31 of transmitter 30. Dials 25 and 15 are each similar to dial 35, each having ten notches accurately spaced 36° apart and having limit stops 25a and 15a, respectively, located between the "9" and "0" positions. Spring or gravity biased detents 26 and 16 coact with the notches in dials 25 and 15, respectively, to maintain dials 25 and 15 in any selected one of their ten positions. Dial 25 is affixed to the rotor shaft 21 of transmitter 20. Dial 15 is affixed to a shaft 11 upon which is mounted a pinion 12. Pinion 12 meshes with a sector gear 23 which is secured to the stator of transmitter 20. The speed reduction between gear 23 and pinion 12 is 10 to 1. Because of limit stop 15a, dial 15 and pinion 12 are adapted to rotate through only nine-tenths revolution. Thus sector gear 23 need not subtend a central angle relative to the axis of transmitter 20 of greater than 33°. A pinion 22 is secured to the rotor shaft 21 of transmitter 20 and meshes with a sector gear 33 affixed to the stator of transmitter 30. The speed reduction between gear 33 and pinion 22 is likewise 10 to 1. Because of limit stop 25a, dial 25 and pinion 22 are adapted to rotate through only nine-tenths revolution. Accordingly, sector gear 33 need not subtend a central angle relative to transmitter 30 of greater than 33°. A pinion 32 is affixed to the rotor shaft 31 of transmitter 30. Pinion 32 meshes with a sector gear 43 mounted upon the stator of transmitter 40. The speed reduction between sector gear 43 and pinion 32 is 10 to 1. Because of limit stop 35a, dial 35 may rotate through only nine-tenths revolution; and sector gear 43 need not subtend a central angle relative to the axis of transmitter 40 of greater than 33°. These limit stops 35a, 25a, and 15a are required to maintain the alignment of the stators of the transmitters. No limit stop is needed, however, for dial 45 since it is connected only to the rotor shaft 41 of transmitter 40.

In operation of my digital multiple-speed synchro system in FIGURE 1, suppose that the dial setting is 4682 as shown. Each of the dials 15 through 45 rotates counterclockwise for increasing digital positions transmitted. This means then that shafts 11 through 41 likewise rotate counterclockwise for increasing digital positions. A counterclockwise rotation of shafts 31, 21, and 11 will likewise produce counterclockwise rotation of pinions 32, 22, and 12. But counterclockwise rotations of pinions 32, 22, and 12 will produce clockwise rotations of sector gears 43, 33, and 23, accompanied by clockwise rotations of the stators of transmitters 40, 30, and 20. Thus the electrical signals appearing on conductors 109 will represent a position not merely of 4000 but rather a position of 4600. Similarly the electrical signals appearing on conductors 108 will represent not merely a position of 600 but rather a position of 680. Similarly the electrical signals on conductors 107 will represent a position not merely of 80, but rather a position of 82. If the load 113 and hence the position of the receiver section differs substantially from the commanded position of 4682, then a large error signal will be generated by receivers 130 and 120. This will cause stepper motor 105 to move armature 104 upwardly until it engages the least sensitive contact 103. Since transmitter 40 commands a position of 4600, servomotor 110 will drive the load 113 and hence shaft 141 of receiver 140 toward a position of 4600 at which would occur a precise null. However, slightly before such precise null is achieved, the output of receiver 140 decreases sufficiently that stepper motor 105 causes armature 104 to disengage contact 103 and engage the intermediate sensitivity contact 102 associated with the intermediate-speed receiver 130. Transmitter 30, it will be recalled, commands a position of 680. Since the load 113 is positioned very close to 4600 at the time armature 104 switches from contact 103 to 102, the receiver system will be driven toward a position of 4680 rather than to the erroneous position 3680. As the receiver section approaches the position 4680 and hence a precise null, the output of receiver 130 decreases sufficiently that stepper motor 105 causes armature 104 to disengage contact 102 and engage the high sensitivity contact 101 associated with the high-speed receiver 120. Transmitter 20, it will be recalled, commands a position of 82. Since the load 113 is positioned very close to 4680 at the time armature 104 switches from contact 102 to contact 101, the receiver system will be driven to the desired position of 4682 rather than to the erroneous position 4582.

Highest speed transmitter 20 and highest speed receiver 120 should each have two-place accuracy, which means that the angular error in each of these synchros should not exceed ±0.9°, or ±0.25% of 360°. The error in each of transmitters 30 and 40 and in each of receivers 130 and 140 need not be as small as that in each of synchros 20 and 120 but should preferably be not greater than ±1.0% of 350°, or ±3.6°.

In order to change the transmitter setting from the given position of 4682 to a new setting of 9682, it is not necessary to turn highest speed dial 15 through five hundred revolutions nor it is required to turn dial 25 through fifty revolutions, rather dial 45 may be independently turned counterclockwise five clicks through half a revolution to achieve the desired new transmitter setting.

Referring now to FIGURE 2, I have provided four synchro transmitters indicated generally by the reference characters 280, 270, 250, and 230, and having rotors 280a, 270a, 250a, and 230a, respectively. Dial 285 which provides the most significant digit is provided with ten notches accurately spaced 36° apart. A spring biased detent 286 is adapted to engage the various notches to lock dial 285 in any one of its ten positions. Dial 285 is secured to a shaft 287 to which is affixed a bevel gear 287a. I have provided a differential gear indicated generally by the reference numeral 289 and having an input bevel gear 287b, an output bevel gear 281a, and a spider shaft 288. Bevel gear 287a meshes with input bevel gear 287b of differential 289. Output bevel gear 281a of differential 289 meshes with a bevel gear 281b which is secured to the rotor shaft 281 of transmitter 280. The seven remaining digital places are provided by dials 275, 265, 255, 245, 235, 225, and 215, respectively, each having ten notches accurately spaced 36° apart, and each having spring or gravity biased detents 276, 266, 256, 246, 236, 226, and 216, respectively, adapted to lock each of the dials in any one of their ten positions. Dials 275 through 215 are provided with limit stops 275a, 265a, 255a, 245a, 235a, 225a, and 215a, respectively, between the "0" and "9" positions. Dial 275 is secured to a shaft 277 to which is affixed a bevel gear 277a. Also secured to shaft 277 is a bevel pinion 272 which meshes with a sector bevel gear 283. Sector bevel gear 283 is secured to the spider shaft 288 of differential 289. Preferably input and output bevel gears 287b and 281a have equal diameters; and bevel gears 287a and 281b also have equal diameters which, however, are smaller than those of input and output gears 287b and 281a. The speed reduction between spider shaft 288 and shaft 277 afforded by bevel pinion 272 and sector bevel gear 283 is 20 to 1. I have provided a differential gear indicated generally by the reference numeral 279 and having an input bevel gear 277b, an output bevel gear 271a, and a spider shaft 278. Bevel gear 277a meshes with input bevel gear 277b of differential 279. Output bevel gear 271a of differential 279 meshes with a bevel gear 271b which is secured to the rotor shaft 271 of transmitter 270. The input and output gears 277b and 271a of differential 279 preferably have equal pitch diameters. Bevel gears 277a and 271b have equal pitch diameters which, however, are smaller than those of input and output gears 277b and 271a of differential 279. Dial 265 is secured to a shaft 267 to which is affixed a bevel gear 265a. I have provided a differential gear indicated generally by the reference numeral 269, having an input gear 267b and an output gear 261a and a spider shaft 268. Bevel gear 267a meshes with the input gear 267b of differential 269. Output gear 261a of differential 269 meshes with a bevel gear 261b which is secured to a shaft 261. Shaft 261 drives a bevel pinion 262 which meshes with a sector bevel gear 273. Sector bevel gear 273 is affixed to the spider shaft 278 of differential 279. The speed reduction between shafts 261 and 278 afforded by bevel pinion 262 and sector gear 273 is 20 to 1. Dial 255 is secured to a shaft 257 which drives a bevel pinion 252. Bevel pinion 252 meshes with a sector bevel gear 263 which is secured to the spider shaft 268 of differential gear 269. The speed reduction between shafts 257 and 268 afforded by bevel pinion 252 and sector gear 263 is 20 to 1. Also affixed to shaft 257 is an idler gear 257a which meshes with another idler gear 251a. Idler gear 251a is secured to the rotor shaft 251 of transmitter 250. Idler gears 257a and 251a have equal pitch diameters so that the speed ratio between shafts 257 and 251 is 1 to 1 with merely a reversal in direction of rotation. Dial 245 is affixed to a shaft 247 which drives a bevel gear 247a. I have provided a differential gear indicated generally by the reference numeral 249, having an input gear 247b, an output gear 241a, and a spider shaft 248. Bevel gear 247a meshes with the input gear 247b of differential 249. The output gear 241a of differential 249 meshes with a bevel gear 241b which is secured to a shaft 241 having affixed thereto a pinion 242. Input and output gears 247b and 241a have equal pitch diameters; and bevel gears 247a and 241b have equal pitch diameters, which however are smaller than those of input and output gears 247b and 241a of differential 249. Pinion 242 meshes with a sector gear 253. The stators of transmitters 280 and 270 are constrained from rotation. However, the stator 250b of transmitter 250 is rotatably mounted in a stationary plate 254; and sector gear 253 is secured to the stator 250b of transmitter 250. The speed reduction afforded by pinion 242 and sector gear 253 is 10 to 1. Dial 235 is secured to a shaft 237 to which is affixed a bevel pinion 232 meshing with a sector bevel gear 243 which is affixed to the spider shaft 248 of differential 249. The speed reduction between shafts 237 and 248 afforded by bevel pinion 232 and sector gear 243 is 20 to 1. Shaft 237 also drives a bevel gear 237a. I provide a differential gear indicated generally by the reference numeral 239 having an input gear 237b, an output gear 231a, and a spider shaft 238. Bevel gear 237a meshes with input gear 237b. Output gear 231a meshes with a bevel gear 231b which is affixed to the rotor shaft 231 of transmitter 230. Input and output gears 237b and 231a have equal pitch diameters; and bevel gears 237a and 231b also have equal pitch diameters which, however, are smaller than those of input and output gears 237b and 231a. Dial 225 is affixed to a shaft 227 which drives a bevel pinion 222. Bevel pinion 222 meshes with a sector bevel gear 233 which is secured to spider shaft 238. The speed reduction between shaft 227 and spider shaft 238 afforded by bevel pinion 222 and sector gear 233 is 20 to 1. Least significant digital dial 215 is secured to a shaft 217 which drives a pinion 212. Pinion 212 meshes with a sector gear 223 which is affixed to a shaft 221. Shaft 221 drives a pinion 222a which meshes with a sector gear 233a. The stator 230b of transmitter 230 is rotatably mounted in a staionary plate 234; and sector gear 233a is secured to the stator 230b of transmitter 230. The speed reduction between shafts 217 and 221 afforded by pinion 212 and sector gear 223 is 10 to 1; and the speed reduction between shaft 221 and stator 230b afforded by pinion 222a and sector gear 233a is likewise 10 to 1. Thus the total speed reduction between dial 215 and stator 230b of transmitter 230 is 100 to 1.

As is well-known in the art and as will be appreciated by reference to FIGURE 2, a clockwise rotation of dial 285 will cause, through differential gear 289, a counterclockwise rotation of rotor shaft 281; a clockwise rotation of dial 275 will cause, through differential gear 279, a counterclockwise rotation of rotor shaft 271; a clockwise rotation of dial 265 will cause, through differential gear 269, a counterclockwise rotation of pinion 262; a clockwise rotation of dial 255 will cause, through the reversing idler gears 257a and 251a, a counterclockwise rotation of rotor shaft 251; a clockwise rotation of dial 245 will cause, through differential gear 249, a counterclockwise rotation of pinion 242; a clockwise rotation of dial 235 will cause, through differential gear 239, a counterclockwise rotation of rotor shaft 231; a clockwise rotation of dial 225 will cause a clockwise rotation of pinion 222; and a clockwise rotation of dial 215 will cause, through the reversing action of speed reduction gearing comprising pinion 212 and sector gear 233, a counterclockwise rotation of pinion 222a. As is also well-known in the art, the nature of differential gearing is such that when the input gear is held stationary, there occurs a step-up ratio of 2 to 1 between the spider shaft and the output gear such that one revolution of the spider shaft will produce two revolutions of the output gear. Because of the inherent 2 to 1 step-up in speed ratio introduced by each of the differential gears, it was necessary to provide a speed reduction of 20 to 1 in each of the bevel pinion and sector bevel gear combinations so that the resultant speed reduction would be the desired ratio of 10 to 1. It will be noted in FIGURE 2 that for differentials 289, 249, and 239 the input gear is to the right, while the output gear is to the left. However, for differentials 279 and 269 the input gear is to the left, while the output gear is to the right. Thus a clockwise rotation of dial 275 will produce a counterclockwise rotation of rotor shaft 281; a clockwise rotation of dial 265 will produce a counterclockwise rotation of rotor shaft 271; a clockwise rotation of dial 255 will produce a counterclockwise rotation of rotor shaft 271; a clockwise rotation of dial 235 will produce a counterclockwise rotation of pinion 242; finally counterclockwise rotation of pinions 242 and 222a will produce clockwise rotation of stators 250b and 230b. Thus for increasing digital counts, rotor shafts 281, 271, 251, and 231 will rotate counterclockwise, while stators 250b and 230b will rotate clockwise.

Because of limit stops 275a, 255a, 235a, and 225a, dials 275, 255, 235, and 225, respectively, are adapted to rotate through only nine-tenths revolution. Because of the 20 to 1 speed reduction associated with the bevel sector gears which are connected to the spider shafts, sector gears 283, 263, 243, and 233 need not subtend a central angle of greater than 17°. It will be noted that pinion 262 rotates not only in response to dial 265 but also in response to dial 255. Because of limit stop 265a, the rotation of dial 265 is limited to nine-tenths revolution. Thus pinion 262 may rotate through 0.99 revolution. Thus sector gear 273 need not subtend a central angle greater than 18°. The speed reduction between pinion 212 and sector gear 223 is 10 to 1. Limit stop 215a prevents dial 215 from turning through more than nine-tenths revolution. Sector gear 223 will thus turn through only .09 revolution and hence need not subtend a central angle of greater than 33°. Sector gear 233a is thus limited to a rotation of .009 revolution and need not subtend a central angle relative to the axis of transmitter 230 of greater than 3.3°. Pinion 242 rotates not only in response to movement of dial 245 but also in response to dial 235. Limit stop 245a prevents movement of dial 245 beyond nine-tenths revolution. Thus pinion 242 may rotate through 0.99 revolution. Accordingly, sector gear 253 need not subtend a central angle relative to the axis of transmitter 250 of greater than 36°. It will be noted that no limit stop is needed for dial 285 since it is connected only to transmitter 280. The other limit stops are required to maintain alignment of transmitters 270, 250, and 230.

The angular error of transmitter 280 should preferably be not greater than ±1% of 360° or 3.6°. The angular error of each of transmitters 270 and 250 should preferably be not greater than about ±0.1% of 360° or 0.4°. Highest speed transmitter 230 should have three-place accuracy, which means that its angular error should not exceed about ±.025% of 360° or ±0.1°. As will be appreciated by those skilled in the art, each of transmitters 280, 270, 250, and 230 has associated with it a corresponding synchro receiver or control transformer. The receiver corresponding to transmitter 230 should be reduction geared by a ratio of 100 to 1 to another receiver corresponding to transmitter 250. The receiver corresponding to transmitter 250 should be reduction geared by a ratio of 100 to 1 to a receiver corresponding to transmitter 270. Finally the receiver corresponding to transmitter 270 should be reduction geared by a ratio of 10 to 1 to a low-speed receiver corresponding to transmitter 280 in a similar manner to the 10 to 1 speed reduction gearing between receivers 130 and 140 of FIGURE 1. A further modification is required in that stepper motor 105 should switch from transmitter 280 to transmitter 270 when the error signal of transmitter 280 becomes less than 0.104 of its maximum error signal as in FIGURE 1; but stepper motor 105 should switch from transmitter 270 to transmitter 250 only when the error signal of transmitter 270 drops below .0104 of its maximum error signal; and stepper motor 105 should switch from transmitter 250 to transmitter 230 only when the error signal of transmitter 250 becomes less than .0104 of its maximum error signal.

In operation of my transmitter section for a multiple-speed synchro system in FIGURE 2, suppose that the dial setting is 37,286,594 as shown. The electrical signals transmitted by synchro 280 will represent a position not merely of 30,000,000 but rather a position of 37,000,000. Similarly the electrical signals transmitted by synchro 270 will represent a position not merely of 7,000,000 nor merely a position of 7,200,000 but rather a position of 7,280,000. The electrical signals transmitted by synchros 250 will represent not merely a position of 80,000 nor merely a position of 86,000 but rather a position of 86,500. And finally the electrical signals transmitted by synchro 230 represent not merely a position of 500 nor merely a position of 590 but rather a position of 594. If the load 113 and hence the position of the receiver section differs substantially from the commanded position, then a large error signal will be present causing the stepper motor 105 to move the switch armature 104 until it is responsive to transmitter 280. The receiver section will be driven toward the position of 37,000,000 commanded by transmitter 280 at which would occur a precise null. However, when the error signal of transmitter 280 drops below 0.104 of its maximum error signal, stepper motor 105 causes the switching armature 104 to become responsive to transmitter 270. Transmitter 270, it will be recalled, commands a position of 7,280,000. Since the load is positioned very close to 37,000,000 at the time of switching from transmitter 280 to transmitter 270, the receiver section will be driven toward a position of 37,280,000 rather than to the erroneous position of 27,280,000. As the receiver section approaches the position 37,280,000 and hence a precise null, the error signal of transmitter 270 drops below .0104 of its maximum error signal; and stepper motor 105 causes switch armature 104 to become responsive to transmitter 250. Transmitter 250, it will be recalled, commands a position of 86,500. Since the load 113 is positioned very close to 37,280,000 at the time of switching from transmitter 270 to transmitter 250, the receiver section will be driven toward a position of 37,286,500 rather than to the erroneous position of 37,186,500. As the receiver section approaches the position 37,286,500 and hence a precise null, the error signal of transmitter 250 drops below .0104 of its maximum error signal; and stepper motor 105 causes switch armature 104 to become responsive to transmitter 230. It will be recalled that transmitter 230 commands a position of 594. Since the load 113 is positioned very close to 37,286,500 at the time of switching from transmitter 250 to tansmitter 280, the receiver section will be driven to the desired position of 37,286,594 rather than to the erroneous position of 37,285,594.

It is essential in order to provide unambiguous switching from a lower speed transmitter to a higher speed transmitter that there be introduced into a lower speed transmitter at least the most significant of the digits introduced into a higher speed transmitter. In FIGURE 1 the second most significant digit provided by rotation of dial 35 is introduced not only into transmitter 30 but also into transmitter 40; and the next to least significant digit provided by rotation of dial 25 is introduced not only into transmitter 20 but also into transmitter 30. In FIGURE 2 rotation of dial 275 is introduced not only into transmitter 270 but also into transmitter 280; rotation of dial 255 is introduced not only into transmitter 250 but also into transmitter 270; and rotation of dial 235 is introduced not only into transmitter 230 but also into transmitter 250.

It will be appreciated that bevel pinion 272 which drives bevel sector gear 283, rather than being mounted on shaft 277, may instead be mounted on rotor shaft 271. If this were done, then transmitter 280 would command not merely a position of 37,000,000 but rather a position of 37,280,000. While it is true that at the time of switching from transmitter 280 to transmitter 270 the receiver section will be closer to the final desired position, yet the total system response will not be appreciably improved.

It will be further appreciated that bevel pinion 232 which drives bevel sector gear 243, rather than being mounted on shaft 237, may instead be mounted on rotor shaft 231. If this were done, then transmitter 250 would command not merely a position of 86,500 but rather a position of 86,590. While it is true that at the time of switching from transmitter 250 to transmitter 230 the receiver section will be closer to the final desired position, yet the total system response will not be appreciably improved.

It will be appreciated that the various dials may be positioned either manually or automatically by stepper motors in response to programming information. It will be noted, as shown in FIGURE 2, where three-place synchro transmitters are provided, that at least one differential mechanism must be used.

It will be further appreciated that my differential mechanism need not be limited to an ordinary differential gear. For example, a planetary type differential having a sun gear and a ring gear and a planet carrier may be employed with equal advantage. Or the differential mechanism might comprise a lever or link with a movable pivot point or fulcrum. Or the differential mechanism might comprise a pair of racks connected by a pinion with means for moving the pinion thereby to introduce differential motion.

It wil be appreciated that while I have shown and described a transmitter section to be used in conjunction with a synchro system, yet my invention is equally applicable to other forms of data transmission systems. For example, rather than using synchros, I may instead employ potentiometers, phase shifters, or any other type of transducer.

It will be seen that I have accomplished the objects of my invention. I have provided a digital positioning system where commanded position may be introduced by a few clicks representing less than a full revolution of appropriate dials without the necessity of laboriously turning dials representing digits of lesser significance through many many revolutions. I have provided a multiple-speed digital positioning system in which the load is positioned precisely in accordance with the transmitted settings without either ambiguity or error.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A command section for a digital positioning system including in combination first movable means providing a representation of a digit of a certain significance, second movable means providing a representation of a digit of a lesser significance, means for locking each of the first and second means in each of a plurality of discrete and equally spaced positions, means for preventing movement of the second means beyond predetermined limits, means including a first member and a second member for providing a command signal as a function of relative motion between the first member and the second member, and means responsive both to movement of the first means and to movement of the second means for effecting relative motion between the first member and the second member, thereby to vary the command signal.

2. A comand section for a digital positioning system including in combination first movable means providing a representation of a digit of a certain significance, second movable means providing a representation of a digit of a lesser significance, means for locking each of the first and second means in each of a plurality of discrete and equally spaced positions, means for preventing movement of the second means beyond predetermined limits, means including a first member and a second member for providing a command signal as a function of relative motion between the first member and the second member, means coupling the first means to the first member, and means coupling the second means to the second member.

3. A command section for a digital positioning system including in combination first movable means providing a representation of a digit of a certain significance, second movable means providing a representation of a digit of a lesser significance, means for locking each of the first and second means in each of a plurality of discrete and equally spaced positions, means for preventing movement of the second means beyond predetermined limits, means including a control member for providing a command signal as a function of motion of the control member, a differential mechanism having a first and a second input member and an output member, means coupling the first means to the first input member, means coupling the second means to the second input member, and means coupling the output member to the control member.

4. A command section for a multiple-speed digital positioning system including in combination a first and a second transducer each having a rotor and a stator, first movable means providing a representation of a digit of a certain significance, second movable means providing a representation of a digit of a greater significance, means coupling the first means to the rotor of the first transducer, means coupling the second means to the rotor of the second transducer, and means coupling the first means to the stator of the second transducer.

5. A transmitter section for a multiple-speed digital synchro system including in combination first movable means providing a representation of a digit of a certain significance, second movable means providing a representation of a digit of a lesser significance, means for locking each of the first and second means in each of a plurality of discrete and equally spaced positions, means for preventing movement of the second means beyond predetermined limits, a first and a second synchro transmitter each having a rotor and a stator, means coupling the first means to the rotor of the first transmitter, means coupling the second means to the rotor of the second transmitter, and means coupling the second means to the stator of the first transmitter.

6. A command section for a digital positioning system including in combination means including a first member and a second member for providing a command signal as a function of relative motion between the first member and the second member, first and second and third movable means providing representations of digits of various significances, a differential mechanism, means for applying the representation of the digit of most significance to said first member, means for applying the representation of the digit of least significance to said second member and means including said differential mechanism for applying the representation of the digit of intermediate significance to one of said first and second members.

7. A command section for a digital positioning system including in combination a transducer having a rotor and a stator for providing a command signal as a function of relative motion between said rotor and said stator, first and second and third movable means providing representations of digitis of various significances, a differential mechanism, means for applying the representation of the most significant digit to said rotor, means for applying the representation of the digit of least significance to said stator and means including said differential mechanism for applying the representation of the digit of intermediate significance to said rotor.

8. A digital positioning system including in combination a first and a second transducer each having a rotor and a stator and each providing a signal as a function of relative rotation between the rotor and stator, first movable means providing a representation of a digit of a certain significance, second movable means providing a representation of a digit of a greater significance, third movable means providing a representation of a digit of a still greater significance, means coupling the first movable means to the rotor of the first transducer, means coupling the third movable means to the rotor of the second transducer, means responsive to movement of both said first and said second means for effecting relative rotation between the rotor and the stator of said second transducer, a servomotor, means responsive to the first transducer signal for providing a first error signal, means responsive to the second transducer signal for providing a second error signal, a switching device having a first state and having a second state, means responsive to said switching device in its first state for coupling only said first error signal to said servomotor, means responsive to the switching device in its second state for coupling only the second error signal to the servomotor, and means for shifting said switching device directly from one of said states to the other of said states.

9. A command section for a digital positioning system including in combination first movable means providing a representation of a digit of a certain significance, means permitting unlimited movement of said first movable means, a plurality of second movable means providing representations of digits having lesser significance than said certain significance, means for locking each of said first and said second means in each of a plurality of discrete and equally spaced positions, means for preventing movement of each of said second means beyond predetermined limits, means including a first member and a second member for providing a command signal as a function of relative rotation between the first member and the second member, and means responsive both to movement of the first means and to movement of the second means for effecting relative motion between the first member and the second member thereby to vary said command signal.

References Cited in the file of this patent

UNITED STATES PATENTS

| | | |
|---|---|---|
| 2,560,337 | Fouassin | July 10, 1951 |
| 2,848,670 | Kelling et al. | Aug. 19, 1958 |